Sept. 28, 1937.　　　O. E. CURTIS　　　2,094,144
DISKING IMPLEMENT
Filed June 18, 1936　　　2 Sheets-Sheet 1

Oscar E. Curtis
INVENTOR.
BY
A. B. McCall
ATTORNEYS.

Sept. 28, 1937.  O. E. CURTIS  2,094,144
DISKING IMPLEMENT
Filed June 18, 1936  2 Sheets-Sheet 2
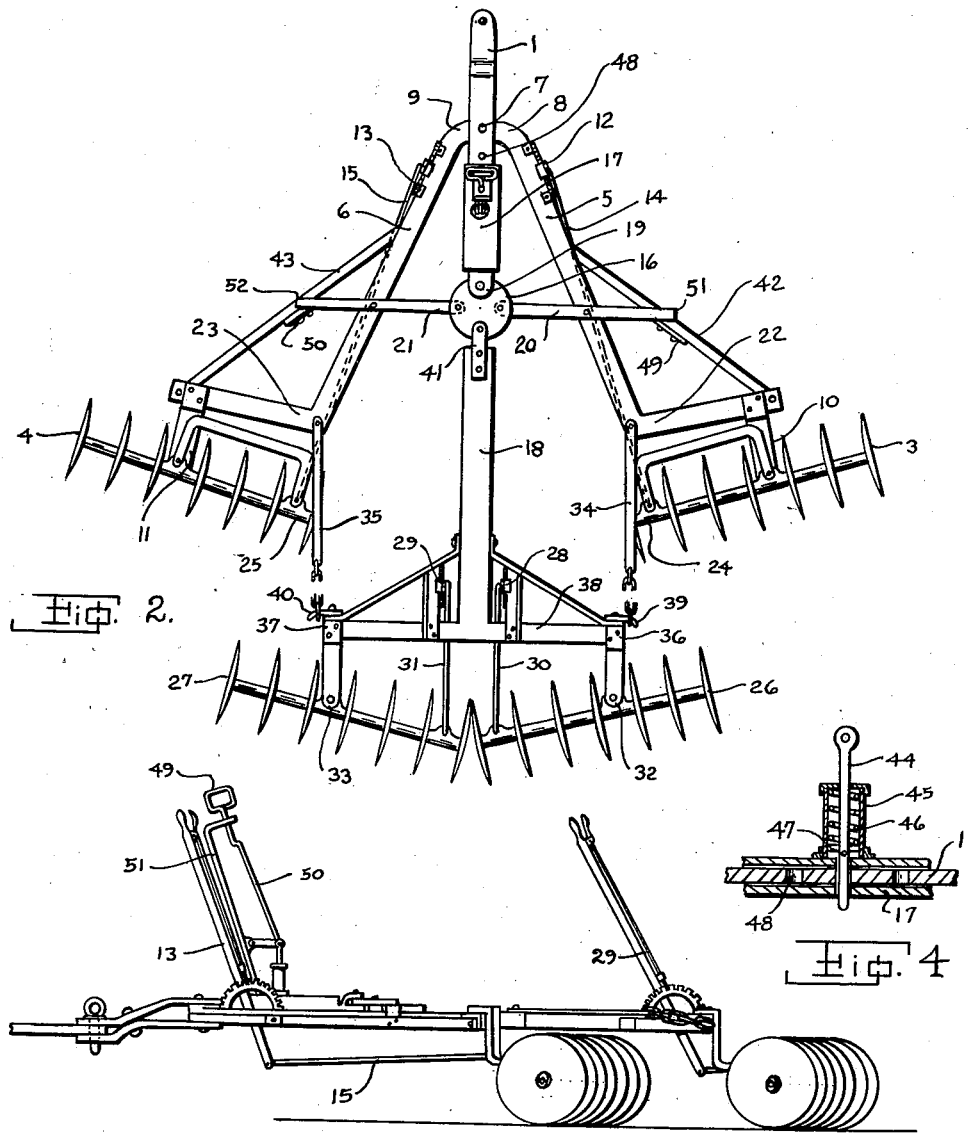

Patented Sept. 28, 1937

2,094,144

UNITED STATES PATENT OFFICE 2,094,144

DISKING IMPLEMENT

Oscar E. Curtis, Mount Pulaski, Ill.

Application June 18, 1936, Serial No. 85,876

18 Claims. (Cl. 55—83)

My invention relates to farm implements for cultivating soil; an object being in my device to provide certain improvements in disk cutters, which improvements will operatively permit an adjustment of the movable arms of the implement making it possible to widen or extend the same from the contracted position of the disk gang for cultivating a field and to contract the position thereof, when it is desired to do so, to go through a gate and the like.

A particular purpose of my invention is to provide a farm implement known as a disk cutter, possessing novel improvements which will permit an easy and convenient adjustment therein from the seat of a tractor or other means of motor power so that when it is desired to go through a gate, the operating disk gang members, which are spread out when working, may be contracted in their position where they may roll along under the frame with the adjacent ends of oppositely disposed disk gangs abutting to make the cutter as narrow as possible while passing through the gate.

I attain the objects of my invention by the implement described in the annexed specification, recited in the claims, and illustrated in the accompanying drawings in which like reference numerals indicate like parts in the several figures.

Referring to the figures:

Fig. 2 is a top or plan view of the same cutter shown in its widely spread operating position.

Fig. 3 is a side elevation of my disk gang cutter.

Fig. 4 is a detail of the locking pin used for holding the slidably fitting sleeve in its operating engagement with the front draw bar.

Figure 1:
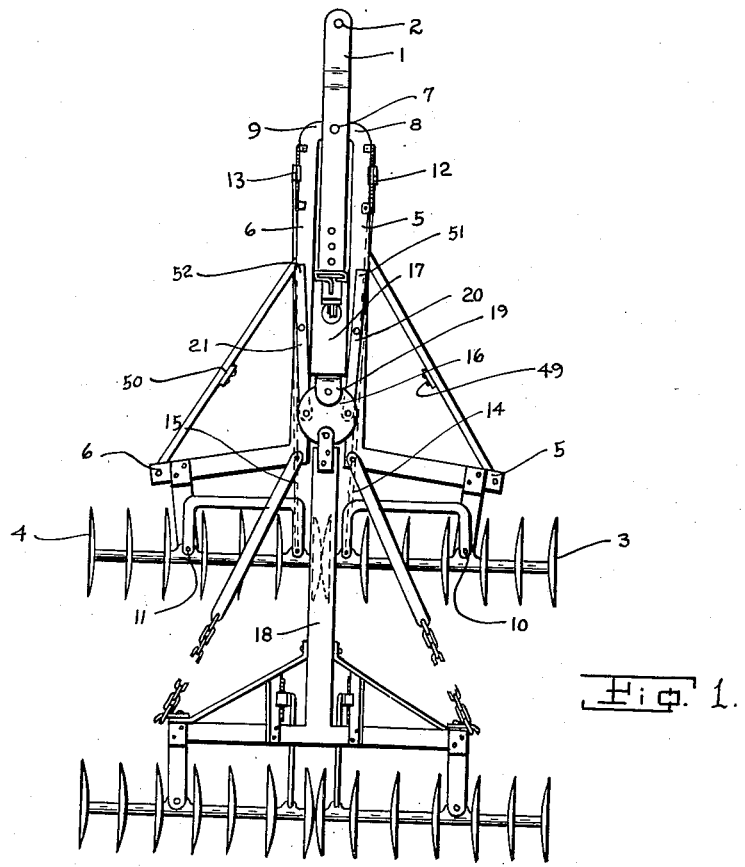
Fig. 1 is a top or plan view of my disk gang cutter, shown as when contracted to pass through a gate.

I shall now point out the mechanical details of my novel improvements in disk gang cutters and shall explain the salient features thereof which permit the same to operate with such effective results.

I have not shown in the drawings a common tractor which may be expected to be used as the motive power for pulling my disk gang cutter when in operation, since it is thought to be a sufficient disclosure merely to illustrate the cutter, incorporating my invention.

Thus, in a detailed study of my improved disk gang cutter, it will be noted that I provide a forward draw bar 1 provided with a forward coupling pin hole 2 for detachably connecting therewith a tractor for pulling the same.

In order to operatively support opposite forward disk gangs 3 and 4, and make it possible to optionally adjust them both to operating or contracted position, I provide a side arm 5 on one side and 6 on the other, each pivoted to forward draw bar 1 by a pin or bolt 7 which holds the forward pivotal end 8 of arm 5 and forward pivotal end 9 of arm 6.

Gang 3 is pivotally supported on a bracket 10 of arm 5 while gang 4 is pivotally supported on a bracket 11 of arm 6; while the pivotal adjustment of gangs 3 and 4 is respectively made by adjustment levers 12 on the forward end of arm 5 and 13 on the forward end of arm 6. This adjustment is made possible through levers 12 and 13 by adjustment rods 14 and 15 respectively.

Thus, the pivotal adjustment of gangs 3 and 4 determines the extent to which the rotation of these disk gangs may agitate the soil when they cut into the soil at a selected angle. In a study of Fig. 1, it will be observed that the disk gangs in this position to run through a gate would not agitate the soil that they run over, but would merely roll upon it. Joint plate 16 provides a common means of pivotal engagement for certain salient features of my invention.

For instance, sleeve member 17, which provides the slidable operating connection between the forward draw bar 1 and the rear draw bar 18, engages the forward portion of joint plate 16 through a yoke member 19 secured to joint plate 16 in a position normally holding plate 16 up high enough to permit the disk gang members to move in under it when the supporting frame therefor is adjusted for the cutter to move through a gate.

The pivoted side braces 20 establishing adjustable connection between joint plate 16 and arm 5 and 21 establishing like connection between joint plate 16 and arm 6 are adapted to operatively brace these two side arms when the disk gang cutter is in spreaded position for operation.

It will be noted that arms 5 and 6 are shaped to provide a sort of elbow 22 and 23 respectively which hold the forward disk gangs to the desired position when contracted or when spread for operation.

It will be noted that when side arms 5 and 6 are spread to the cutter's operating position, then sleeve 17 slidably moves forward on draw bar 1 and relatively moves forward also with joint plate 16 and all of the members which engage the same; while when contracting the cutter to go through a gate, permits sleeve 17 to slidably move back on draw bar 1.

This rearward slidable adjustment of sleeve 17 causes rear draw bar 18 to drop back further from said draw bar 1 while at the same time, the inner ends of brace arms 20 and 21 drop back with joint plate 16 permitting their outer ends, engaging side arms 5 and 6 respectively, to fold inwardly, permitting the adjacent ends 24 and 25 of disk gangs 3 and 4 respectively to line up in an abutting position under the rear draw bar 18 when the tractor pulling the implement moves forward.

In order to permit the rear disk gangs 26 and 27 respectively to be pivotally adjusted from their angular position, illustrated in Fig. 2, to their transverse position, shown in Fig. 1, such adjustment may be suitably made by adjusting levers 28 and 29 respectively forcing rods 30 and 31 respectively to pivotally swing gangs 26 and 27 about on their bracket support 32 and 33.

It will be noted that a pair of flexible connections 34 and 35 respectively establish a desired balancing stability between the outer ends 36 and 37 respectively of yoke 38 on rear draw bar 18 and elbows 22 and 23 respectively of arms 5 and 6. These flexible connections are respectively engaging hook members 39 and 40 respectively; and these flexible connections are provided for permitting a better control over the movements of that part of the cutter implement operatively carried by rear draw bar 18, especially when turning a curve.

Draw bar 18 is connected to joint plate 16 by a yoke 41 and brace rods 42 and 43 brace the side arms to which they are attached respectively.

Sleeve 17 slidably engaging yoke 1 is held in its positions of slidable adjustment by a yoke pin 44, which is operatively supported in a spring casing 45 fixed upon sleeve 17 and provided with an inner spring 46. A spring retracting collar 47 in casing 45 and fixed on pin 44, is adapted to lift spring 46 when pin 44 is lifted so that when pin 44 is lifted out of holes 48 in draw bar 1 by a manual pull on handle 54 of lever 55 supported in a bracket 56, to release sleeve 17 for slidable adjustment on draw bar 1, the spring 46, by this construction, will ordinarily force pin 44 down into another one of holes 48, depending upon the direction the sleeve is moved.

Figure 5:
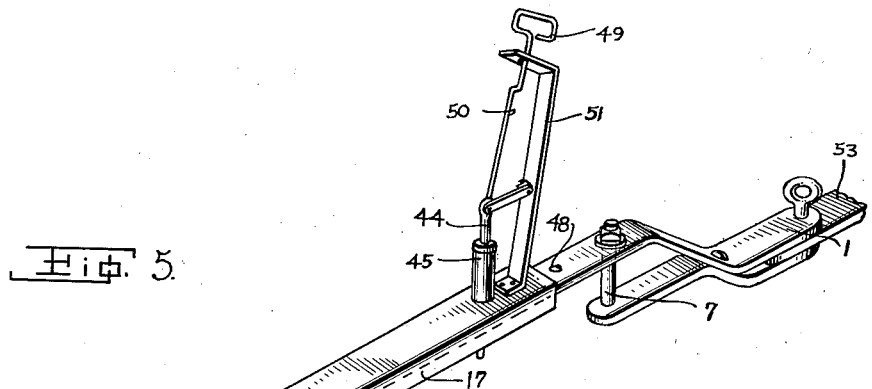
Fig. 5 is a detail of the adjustable sleeve engaging the front and illustrating the novel yoke engagement of the joint plate as well as the method of pivotally securing the side arms to the front draw bar.
Figure 6:
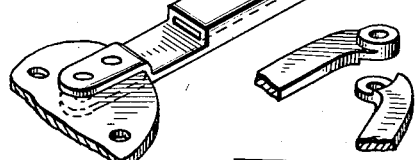
Fig. 6 is a detail of the pivotal end of each of the side arms adapted to be supported by the front draw bar.

A study of Figures 3, 4 and 5 will disclose this operation.

It will be further noted that when a tractor (not shown) is operatively pulling on draw bar 1, the person who is driving the tractor, may sit in the seat and reach back to make the desired adjustments in lever 12 or 13 to permit the disk cutter to be contracted for moving the same through a gate and it is obvious that if desired, adjusting levers 12 and 13 could be extended forwardly if needed to permit them to be more easily reached by the operator.

It will be noted that I provide on brace members 42 and 43 respectively a stop lug 49 and 50 respectively to permit the outer end 51 of brace arm 20 to more rigidly brace side arm 5 and brace rod 42 and to permit the outer end 52 of brace arm 21 to more rigidly brace side arm 6 and brace rod 43 when the cutter is in operation.

It will be also observed that a portion of tractor draw bar 53 is shown in its detachable connection with front draw bar 1.

Having thus described the nature of my implement, what I claim is:

1. A disking implement comprising a forward pull member and a rear pull member, adjustable in its lengthwise connection therewith and means for holding said rear pull member where it is adjusted, side arms operatively connected with the forward pull member for a lateral adjustment, soil agitating members operatively supported on said laterally adjustable arms and on said rear pull member and pivotally adjustable on each; said holding means engaging said rear pull member in its forward lengthwise adjustment when operating, said side arms laterally extended when operating, brace members for holding the side arms in extended position, said side arms contractible and said rear pull member simultaneously and relatively extendible when said holding means is released and when pulling power is then applied to said forward pull member, and said side arms adapted to be again laterally extended and the rear pull member again simultaneously adjustable to a relatively retracted lengthwise position when power is rearwardly applied to said forward pull member.

2. A soil agitating implement comprising a front draw bar and a rear draw bar slidably connected thereto by detachable holding means, side arms having outer disk gangs pivoted thereto and pivoted brace members for holding said side arms in spread position for operating, said side arms pivotally connected to the front draw bar, a rear disk gang carried by said rear draw bar; said soil agitating implement contractible from its operative spread position when said front draw bar is released from said detachable holding means and when pulling power then is applied to said front draw bar.

3. A soil agitating implement comprising a front draw bar and a rear draw bar slidably connected thereto by a detachable holding means therefor, side arms having outer disk gangs pivoted thereto and pivoted brace members for holding said arms in spread position for operating said side arms pivotally connected to the front draw bar, a rear disk gang carried by said rear draw bar and said soil agitating implement operable to spread from a contracted position when a rearward push is applied to said front draw bar.

4. A soil agitating implement comprising a forward draw bar with pivotal attached right and left side arms having pivotal and adjustable attached disk gangs, a rearward draw bar having pivotal and adjustable attached disk gangs, said rear draw bar pivotally attached to a holding member operatively connected to the forward draw bar, and having pivotal attached holding arms pivotally connected to said right and left side arms, which are adapted to contract from an expanded position when said holding member is disengaged and pulling power is applied to the forward draw bar.

5. A soil agitating implement comprising a forward draw bar with pivotal attached right and left side arms having pivotal and adjustable attached disk gangs, a rearward draw bar having pivotal and adjustable attached disk gangs; said rear draw bar pivotally attached to a holding member operatively connected to the forward draw bar and having pivotal attached holding arms pivotally connected to said right and left side arms which are adapted to expand from a contracted position when said holding member is disengaged and reverse power is applied to said forward draw bar.

6. As a new article of manufacture a disk cutter for agitating the soil and comprising a draw bar and a pair of pivotal side arms each operatively and pivotally supporting a disk gang, said draw bar slidably and pivotally supporting a rear draw bar and disk gangs, brace arms pivotally engaging the slidable rear draw bar and establishing a bracing connection between the rear draw bar and said side arms respectively, adjustment levers for selectively setting said disk gang units in the desired pivotal position for operation and a draw bar coupling pin adapted to hold the slidable rear draw bar in its positions of adjustment.

7. As a new article of manufacture a disk cutter for agitating the soil and comprising a draw bar and a pair of pivotal side arms each operatively and pivotally supporting a disk gang, said draw bar slidably and pivotally supporting a rear draw bar and disk gangs, brace arms pivotally engaging the adjustable rear draw bar and establishing a bracing connection between it and said side arms respectively, adjustment levers for selectively setting said pivoted disk gangs for operation and a draw bar coupling pin adapted to hold the slidable rear draw bar in its positions of adjustment; whereby said disk gangs when tilling the soil may be selectively adjusted in their pivotal position to vary the amount of soil agitation and whereby an adjustment may be made in said rear draw bar causing the same to drop back permitting said side arms each to move inwardly to a position that will make the cutter sufficiently narrow when the cutter is pulled forward to pass through an ordinary farm gate and the like.

8. A disk gang cutter for tilling the soil and comprising, a draw bar, side arms pivotally engaging the forward portion of the draw bar and each adapted to operatively and adjustably support a disk gang unit at its rear end, brace arms for strengthening said side arms in their operative position, an adjustable sleeve portion of the draw bar and a pivotal engaging member for connecting the brace arms to the adjustable portion of the draw bar, means for selectively anchoring said draw bar in its respective positions of adjustment, one or more disk gang units operatively connected with the rear of said adjustable portion of the draw bar and an adjustment lever controllably connected with each of said disk gang units on the side arms and on the rear of said draw bar for the operative and selective pivotal adjustment of said disk gangs.

9. A disk gang cutter for tilling the soil and comprising, a draw bar, side arms pivotally engaging the forward portion of the draw bar and each adapted to operatively and adjustably support a disk gang unit at its rear end, brace arms for strengthening said side arms of the frame in their operative position, an adjustable sleeve portion of the draw bar and a pivotal engaging member for connecting the brace arms to the adjustable portion of the draw bar, means for selectively anchoring said draw bar in its respective positions of adjustment, one or more disk gang units operatively connected with the rear of said adjustable portion of the draw bar and an adjustment lever controllably connected with each of said disk gang units on the side arms and on the rear of said draw bar for the operative and selective pivotal adjustment of said disk gangs; whereby said disk gangs when tilling the soil may be selectively adjusted in their pivotal position to vary the amount of soil agitation and whereby a slidable adjustment may be made in said draw bar causing the rear end thereof to drop back permitting said side arms each to move inwardly to a position that will make the cutter sufficiently narrow to pass through an ordinary farm gate when the implement is pulled forward.

10. A disk gang cutter comprising a forward and a rear draw bar pivotally connected, a right and left side arm pivotally engaging said forward drawbar, a pair of pivoted brace arms pivotally connected with said side arms in pre-determined positions when in operation, a slidable sleeve adjustably operative on the rear end of the forward pull beam, means for engaging and dis-engaging said sleeve from its operative position on said forward drawbar to permit the side arms each to swing inwardly when the cutter is being pulled through a gate, a plurality of disk gang cutters respectively and pivotally adjustable for operation adjacent the terminal of each of said side arms and a rear disk gang supported by said slidable portion of the drawbar.

11. A contractible disk cutter comprising a drawbar pivoted side arms for the operative support of the disk members, a central sliding sleeve on said drawbar, brace members establishing pivotal connection with one end of said sleeve and with said arms, said arms pivotally and operatively supporting said disk gang members and means for dis-engaging said sleeve from its operative position on said drawbar and permitting said side arms to pivotally fold inwardly as the sleeve slides on said central drawbar to contract the width of the center when it is desired to pull the implement through a gate.

12. As a new article of manufacture a contractible disk cutter comprising a drawbar, a pair of oppositely disposed side arms pivotally connected with said drawbar for the operative and pivotal support each of a disk gang cutter, a disk gang secured to each of said arms adjustably and pivotally, a central rearwardly extending pull beam provided with a terminal yoke and a disk gang supported by each end thereof and means for the pivotal operative adjustment of said gangs in their support, flexible balancing members establishing an operative support connection between an intermediate portion of each of said side arms and a point on said rear yoke member adjacent the terminals thereof respectively; said central rearwardly extending drawbar pivotally connected with said central forward pull beam through a connecting plate and a slidable sleeve adjustably and operatively engaging the rear end of said forward pull beam, a pair of brace arms establishing pivotal connection between said connecting plate and an intermediate point on each of said side arms respectively, a brace rod on each of said side arms connecting their two terminals respectively and means for dis-engaging the holding means for said slidable sleeve from said forward pull beam for the contractible adjustment of said cutter as the side arms move inwardly, due to a pull on the drawbar after said holding means is released.

13. As a new implement for cultivating purposes a disk gang cutter provided with a pair of oppositely disposed extension side arms and a rearwardly disposed central drawbar having a rear terminal yoke, a disk gang operable for pivotal adjustment adjacent the outer terminal of each of said side arms and on each arm of said yoke, means for holding said disk gang units in their respective positions of pivotal adjustment, a pair of pivoted brace arms adapted to operatively hold said side arms at a pre-determined operating position, a forward drawbar pivotally holding said side arms, a slidable sleeve engaging the rear terminal of said forward drawbar and provided with a lever and locking pin adapted to detachably hold said sleeve into operative position on said forward drawbar, a pivoted connecting plate establishing pivotal engagement between said forward pull drawbar and said central rearwardly extending drawbar, said pivoted plate also providing a side pivotal connection for said brace arms holding said side arms, means for detachably engaging a tractor and the like with said central forward drawbar and a pair of flexible holding members operatively connecting the yoke portion of said rear drawbar with an intermediate portion of each of said side arms.

14. A soil agitating implement comprising a front drawbar, side arms pivoted to the forward part of the drawbar and a rear drawbar slidably and detachably adjustable longitudinally in its operative connection with said front drawbar; soil agitators adjustably secured to said pivoted arm and to said rear drawbar; said cutter operatively disposed in a generally fan shape when in use, said rear drawbar operable to drop back in its slidable engagement with said front drawbar when released from a forward engagement therewith and said side arms operable to pivotally fold in along-side said front drawbar ahead of said rear drawbar thereof when the holding means is thus released, and by a pull on the front drawbar after such release.

15. A soil agitating implement comprising a disk cutter, having side arm sections and a rear central section, a forward draw bar pivotally engaging the forward end of said side arms and slidably engaging said rear central section with a coupling pin for its attachment; soil agitating disk gang members adjustably secured to said side arms and to said rear central section; said implement disposed in a generally fan shape when in operation in the field and operable to slidably drop said central section back on said draw bar and to simultaneously and pivotally contract said side arm sections in alongside of said draw bar ahead of said central rear section as the implement is contracted to move through a fence opening, a gate and the like, when a pulling force is applied to said draw bar after the release of said coupling pin.

16. As a new article of manufacture, a soil agitating implement of the disk harrow type, including a front draw bar, side wings pivoted to the forward portion of the draw bar, and a central rear section of the disk cutter slidably coupled in its operative connection with said draw bar; soil agitator disk gangs adjustably secured to said pivoted arms of the cutter and to said central rear section thereof; said frame assuming a fan shape when in operation, and operable to drop said central rear section back on said draw bar and to simultaneously and pivotally contract said side arm sections in alongside of said draw bar when the implement is pulled forwardly after being released from its coupling with said front draw bar to be moved through a fence opening, a gate and the like; means for holding said side arm sections substantially in out-spread operating position and means for limiting said sections in their pivotal outward adjustment when in operation.

17. A contractible disk gang cutter comprising a frame for the operative support of disk gangs, a forward and a longitudinally aligned rearward draw bar; said draw bars slidably inner-connected and an operating joint plate rearward of the slidable connection between the draw bars provided with pivotal brace arms, a pair of pivotal side arms pivotally engaging the forward draw bar and a corresponding pair of brace arms establishing a pivotal connection between the side arms and said plate; said joint plate operatively supported by said means slidably engaging said forward draw bar and said support means for said joint plate engaging said plate in a position of elevation to permit said disk gang members to be adjustably moved freely beneath the same, a spring actuated holding pin for said slidable adjustment between said draw bars and an adjustable lever operatively connected with said holding pin and disposed in a position within easy reach of an operator for the power control of said cutter, control arms pivotally engaging said disk gang members and an adjustment lever for each control arm for the manipulation thereof, a pivoted disk gang on each of said side arms and adjustment levers therefor, said control levers for said disk gangs operatively mounted adjacent said forward draw bar and disposed in a position within easy reach of said operator when the cutter is in operation.

18. As an improvement in farm implements, the combination with a farm tractor having engaging means for pulling farm implements of a field cultivating disk gang cutter comprising a frame for the operative support of disk gangs, a forward and a longitudinally aligned rearward draw bar; said draw bar slidably inner-connected and an operating joint plate rearward of the slidable connection between the draw bars provided with pivotal brace arms, a pair of pivotal side arms pivotally engaging the forward draw bar and a corresponding pair of brace arms establishing a pivotal connection between the side arms and said plate; said joint plate operatively supported by said means slidably engaging said forward draw bar and said support means for said joint plate engaging said plate in a position of elevation to permit said disk gang members to be adjustably moved freely beneath the same, a spring actuated holding pin for said slidable adjustment between said draw bars and an adjustable lever operatively connected with said holding pins and disposed in a position within easy reach of the operator for the power control of said cutter, control arms pivotally engaging said disk gang members and an adjustment lever for each control arm for the manipulation thereof, a pivoted disk gang on each of said side arms and adjustment levers therefor, said control levers for said disk gangs operatively mounted adjacent said forward draw bar and disposed in a position within easy reach of said operator when the cutter is in operation.

OSCAR E. CURTIS.